(12) United States Patent
Park

(10) Patent No.: US 11,976,787 B2
(45) Date of Patent: May 7, 2024

(54) GAS STORAGE IN NEGATIVE POISSON'S RATIO STRUCTURES

(71) Applicant: Joon Bu Park, Huntington Beach, CA (US)

(72) Inventor: Joon Bu Park, Huntington Beach, CA (US)

(*) Notice: Subject to any disclaimer, the term of this patent is extended or adjusted under 35 U.S.C. 154(b) by 280 days.

(21) Appl. No.: 17/679,941

(22) Filed: Feb. 24, 2022

(65) Prior Publication Data
US 2023/0265972 A1 Aug. 24, 2023

(51) Int. Cl.
| F17C 11/00 | (2006.01) |
| F17C 7/04 | (2006.01) |
| H01M 8/04082 | (2016.01) |

(52) U.S. Cl.
CPC ............. *F17C 11/005* (2013.01); *F17C 7/04* (2013.01); *H01M 8/04216* (2013.01); *F17C 2209/23* (2013.01); *F17C 2221/012* (2013.01); *F17C 2270/0168* (2013.01); *F17C 2270/0184* (2013.01)

(58) Field of Classification Search
CPC ............. F17C 11/005; F17C 2209/23; F17C 2221/012; F17C 2270/0168; F17C 2270/0184; F17C 7/04; H01M 8/04216; Y02E 60/32
See application file for complete search history.

(56) References Cited

U.S. PATENT DOCUMENTS

| 2006/0180505 | A1 | 8/2006 | Alderson et al. |
| 2014/0296804 | A1 | 10/2014 | Hicks et al. |
| 2015/0354755 | A1* | 12/2015 | Madoux ............... F17C 11/00 206/0.6 |
| 2016/0025344 | A1 | 1/2016 | Bertoldi et al. |
| 2018/0283610 | A1 | 10/2018 | Wexler et al. |
| 2020/0347590 | A1 | 11/2020 | Robinson |
| 2021/0030426 | A1 | 2/2021 | Whalen et al. |

OTHER PUBLICATIONS

Körner et al., "A systematic approach to identify cellular auxetic materials," Smart Materials and Structures, Dec. 19, 2014, 24(2):025013.
International Search Report and Written Opinion in International Appln. No. PCT/US2023/063153, dated Aug. 23, 2023, 11 pages.

* cited by examiner

*Primary Examiner* — Victoria H Lynch
(74) *Attorney, Agent, or Firm* — Fish & Richardson P.C.

(57) ABSTRACT

A gas storage apparatus includes a foam body having a negative Poisson's ratio, and a gas impregnated in closed cells of the foam body, the gas having a pressure above atmospheric pressure. A method of making a gas storage apparatus includes providing a first body comprising a precursor material, and, while the first body is in an atmosphere including a gas, applying a stimulus to the precursor material, the stimulus causing the precursor material to form a closed-cell porous foam structure having a negative Poisson's ratio. Cells of the closed-cell porous foam structure encapsulate the gas at a pressure above atmospheric pressure.

20 Claims, 8 Drawing Sheets

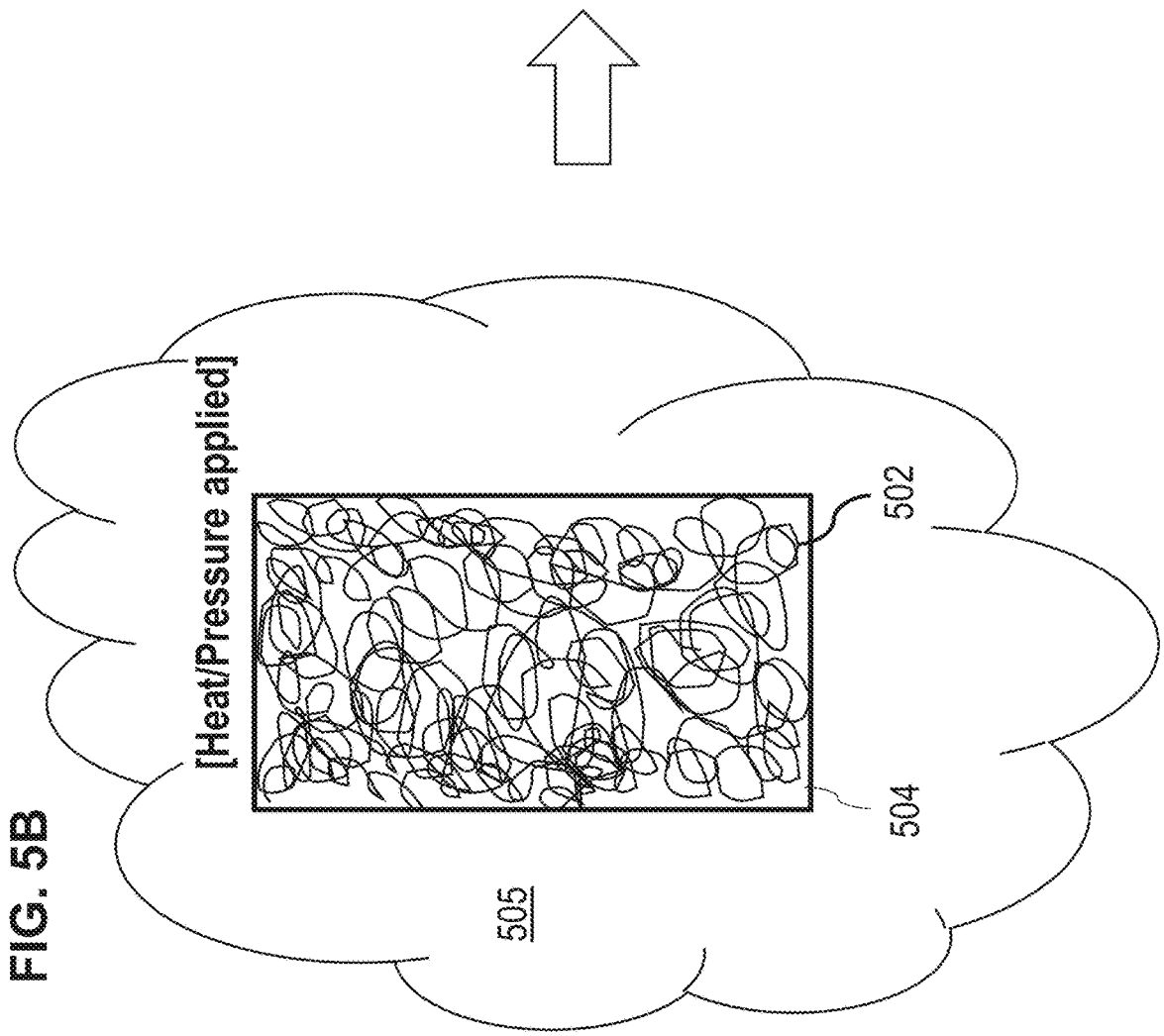
FIG. 5B
FIG. 5A
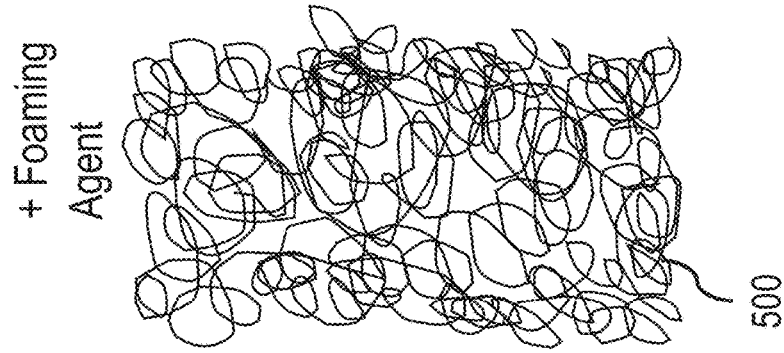

GAS STORAGE IN NEGATIVE POISSON'S RATIO STRUCTURES

BACKGROUND

The present disclosure relates generally to gas storage using structures having negative Poisson's ratios.

Hydrogen fuel cells can be used to power vehicles such as automobiles, buses, and boats. In hydrogen fuel cells, hydrogen reacts exothermically with an oxidant such as oxygen to produce electricity, water, and heat. In hydrogen internal combustion engines, an oxygen-hydrogen combustion reaction drives rotation of a shaft.

SUMMARY

We describe here gas storage structures that include materials having a negative Poisson's ratio ("NPR materials") that can provide various advantages over the use of positive Poisson's ratio-only materials ("PPR materials") for gas storage, such as in PPR gas storage tanks. For example, in some implementations, the negative Poisson's ratio materials can provide improved mechanical stability to the gas storage structures, allowing for higher internal gas pressures. In some implementations, the gas storage structures can be lighter weight because of the inclusion of NPR materials. In some implementations, the NPR materials can provide improved stress response characteristics to the gas storage structures. In some implementations, the gas storage structures can be handled and transferred at room temperature and/or ambient pressure, allowing the stored gas to be transferred for use in reactions. In some implementations, the porous nature of NPR materials is conducive to internal gas storage. Stored gases can include hydrogen, oxygen, or other gas types.

Some aspects of this disclosure describe a gas storage apparatus. The gas storage apparatus includes a foam body having a negative Poisson's ratio, and a gas impregnated in closed cells of the foam body, the gas having a pressure above atmospheric pressure.

Implementations of this and other described apparatuses can have any one or more of at least the following characteristics.

In some implementations, the gas includes hydrogen.

In some implementations, the hydrogen has a purity of at least 95%.

In some implementations, the foam body includes a porous carbon structure.

In some implementations, the foam body includes a stacked re-entrant cell structure.

In some implementations, the foam body is a microsphere or a nanosphere.

In some implementations, the foam body has a dimension of less than 100 microns.

In some implementations, the gas impregnated in the closed cells of the foam body has a pressure of at least 100 psig.

In some implementations, the apparatus includes a coating covering the foam body, the coating having a positive Poisson's ratio.

In some implementations, the foam body includes a combustible metal.

Some aspects of this disclosure describe a method of making a gas storage apparatus. The method includes providing a first body including a precursor material; and, while the first body is in an atmosphere including a gas, applying a stimulus to the precursor material, the stimulus causing the precursor material to form a closed-cell porous foam structure having a negative Poisson's ratio. Cells of the closed-cell porous foam structure encapsulate the gas at a pressure above atmospheric pressure.

Implementations of this and other described methods can have any one or more of at least the following characteristics.

In some implementations, the stimulus includes at least one of heat or pressure.

In some implementations, the gas includes hydrogen.

In some implementations, the hydrogen has a purity of at least 95%.

In some implementations, the method includes, subsequent to applying the stimulus, dividing the first body including the closed-cell porous foam into a plurality of gas storage bodies, each gas storage body having a dimension less than 100 microns.

In some implementations, the method includes forming a coating having a positive Poisson's ratio over the first body.

Some aspects of this disclosure describe another method. The method includes providing a gas storage body into an internal storage tank of a vehicle. The gas storage body includes a foam body having a negative Poisson's ratio, and hydrogen gas impregnated in closed cells of the foam body. The method includes releasing the hydrogen gas from the foam body; and reacting the released hydrogen gas with oxygen gas.

Implementations of this and other described methods can have any one or more of at least the following characteristics.

In some implementations, releasing the hydrogen gas from the foam body includes vaporizing or combusting the foam body.

In some implementations, reacting the released hydrogen gas with oxygen gas includes combusting the released hydrogen gas and the oxygen gas.

In some implementations, reacting the released hydrogen gas with oxygen gas includes facilitating a redox reaction in a hydrogen fuel cell.

Other implementations are also within the scope of the claims.

DESCRIPTION OF DRAWINGS

FIGS. 5A-5D are diagrams illustrating an example of a method of making gas-encapsulating NPR gas storage bodies.

DETAILED DESCRIPTION

This disclosure describes gas storage using materials having a negative Poisson's ratio ("NPR materials"), sometimes referred to as auxetic materials. In some implementations, an NPR foam body or composite NPR-positive Poisson's ratio (PPR) foam body impregnates a pressurized gas such as hydrogen gas. The NPR composition of the foam body can facilitate reduced weight and improved mechanical stability (e.g., improved stress response).

Figure 1:
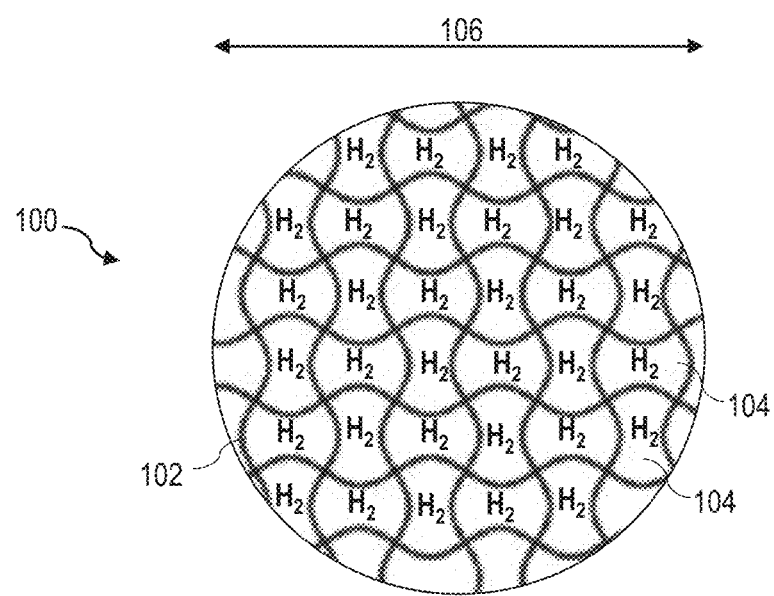
FIG. 1 is a diagram illustrating an example NPR gas storage body encapsulating hydrogen.

Referring to FIG. 1, an example gas storage body 100 has a porous structure 102 that has a negative Poisson's ratio. The porous structure 102 defines cells 104, at least some of which are "closed," meaning that the cells 104 are fully enclosed by the porous structure 102. A gas such as hydrogen gas ($H_2$) is encapsulated in the cells 104, which can be (though need not be) at a positive pressure with respect to a pressure external to the gas storage body 100. For example, the gas can have a pressure higher than atmospheric pressure (1 atm) at room temperature.

In some implementations, the gas storage body 100 is "microscale" in that it has at least one dimension 106 (e.g., a length, a width, or a thickness) that is less than 100 microns. In various implementations, the gas storage 100 has at least one dimension 106 that is less than 50 microns, less than ten microns, less than five microns, or less than one microns. In some implementations, the gas storage body 100 is "nanoscale," meaning that the dimension 106 is less than 500 nanometers, less than 100 nanometers, less than 50 nanometers, or less than 10 nanometers. The dimension 106 is limited, on its low end, by fabrication capabilities and by cell sizes of the gas storage body 100. For example, the dimension 106 can be greater than 1 nanometer, greater than 5 nanometers, greater than 10 nanometers, greater than 50 nanometers, or greater than 100 nanometers, depending on the implementation. In some implementations, microscale gas storage bodies can exhibit more resilient mechanical properties due to volume/surface area scaling. For example, in some implementations, microscale gas storage bodies can store gas at higher pressures than can larger gas storage bodies. Moreover, in some implementations microscale gas storage bodies vaporize/combust more easily than macroscopic gas storage bodies for matching total weights of the bodies (e.g., vaporize/combust at lower temperatures and/or more quickly), improving stored gas release characteristics in application such as fuel cells.

In some implementations, the gas storage body 100 is not microscale. For example, a macroscale gas storage body can have a dimension 106 that is greater than 50 microns, such as between 50 microns and 10 centimeters, e.g., between 1 millimeter and 5 centimeters.

The shape of the gas storage body 100 can vary depending on the implementation. In some implementations, the gas storage body 100 is microscale and is substantially spherical, such that the gas storage body 100 is a microsphere or a nanosphere. In some implementations, the gas storage body 100 is microscale and is elongated, such that the gas storage body 100 is a micro-wire/micro-tubule or nanowire/nano-tubule. Other shapes are also within the scope of this disclosure. For example, a shape of the gas storage body 100 can be defined by a mold by which the gas storage body 100 is caused to become auxetic, such that a shape of the mold is transferred to the gas storage body 100. Based on a shape of the mold, the gas storage body 100 can have any suitable shape, such as spherical, cuboid, cylindrical, a polyhedron (e.g., an irregular polyhedron), or another three-dimensional shape.

The cellular pattern of the porous structure 102 provides a negative Poisson's ratio (auxeticity) to the gas storage body 100 as a whole, and the porous structure 102 can be described as a whole as an NPR material. An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a PPR material has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 2:
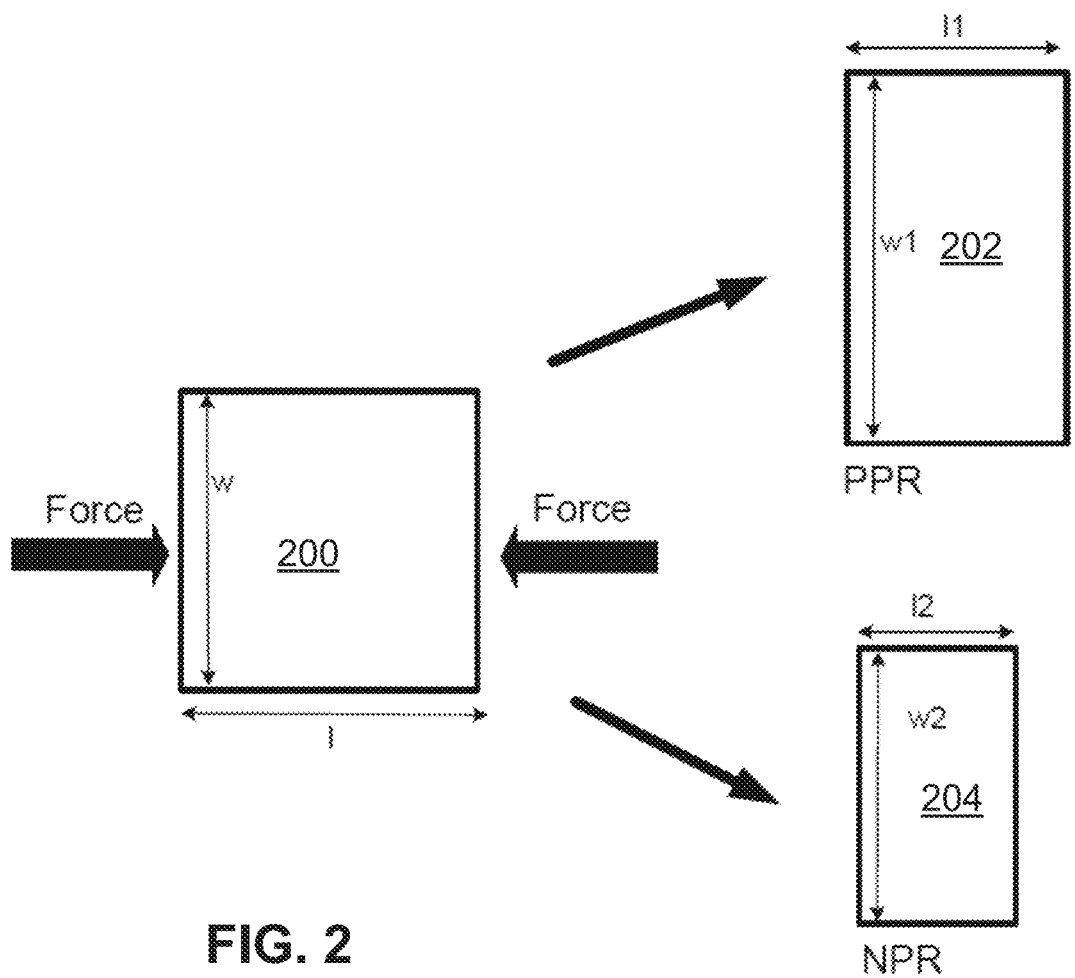
FIG. 2 is a diagram illustrating force responses of example NPR and PPR materials.

Materials with negative and positive Poisson's ratios are illustrated in FIG. 2, which depicts a hypothetical two-dimensional block of material 200 with length l and width w. If the hypothetical block of material 200 is a PPR material, when the block of material 200 is compressed along its width w, the material deforms into the shape shown as block 202. The width $w_1$ of block 202 is less than the width w of block 200, and the length $l_1$ of block 202 is greater than the length l of block 200: the material compresses along its width and expands along its length.

By contrast, if the hypothetical block of material 200 is an NPR material, when the block of material 200 is compressed along its width w, the material deforms into the shape shown as block 204. Both the width $w_2$ and the length $l_2$ of block 204 are less than the width w and length l, respectively, of block 200: the material compresses along both its width and its length.

A foam is a multi-phase composite material in which one phase is gaseous and the one or more other phases are solid (e.g, polymeric, ceramic (e.g., a carbon-based ceramic), metallic, otherwise carbon-based, or a combination thereof). The gas storage body 100 is a foam in which the hydrogen represents the gaseous phase and the porous structure 102 is solid. NPR gas storage bodies for storage of hydrogen and/or other gases can be polymeric foams, ceramic foams, metallic foams, carbon foams, or combinations thereof. In general, foams can be closed-cell foams, in which each gaseous cell is sealed by solid material; open-cell foams, in which each cell communicates with the outside atmosphere; or mixed, in which some cells are closed and some cells are open. For purposes of gas storage, at least some of the cells of the porous structure 102 are closed to prevent escape of the gas contained within. In some implementations, other cells can be open.

An example of an NPR foam structure is a re-entrant structure, which is a foam in which the walls of the cells are concave, e.g., protruding inwards toward the interior of the cells, such as at least some of the cells 104 in FIG. 1. In a re-entrant foam, compression applied to opposing walls of a cell will cause the other, inwardly directed walls of the cell to buckle inward further, causing the material in cross-section to compress, such that a compression occurs in all directions. Similarly, tension applied to opposing walls of a cell will cause the other, inwardly directed walls of the cell to unfold, causing the material in cross-section to expand, such that expansion occurs in all directions. NPR foams can have a Poisson's ratio of between −1 and 0, e.g., between −0.8 and 0, e.g., −0.8, −0.7, −0.6, −0.5, −0.4, −0.3, −0.2, or −0.1. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

An NPR foam can be polydisperse (e.g., the cells of the foam are not all of the same size) and/or disordered (e.g., the cells of the foam are randomly arranged, as opposed to being arranged in a regular lattice). An NPR foam can have a characteristic dimension (e.g., the size of a representative cell (e.g., average-size cell), such as the width of the cell from one wall to the opposing wall) ranging from 0.005 µm to about 3 mm, e.g., about 0.01 µm, about 0.02 µm, about 0.05 µm, about 0.1 µm, about 0.5 µm, about 1 µm, about 10 µm, about 50 µm, about 100 µm, about 500 µm, about 1 mm, about 2 mm, or about 3 mm, or any range delimited by any two of these values.

Examples of cell structures that can be realized on a macroscale or on a micro/nano scale in microscale gas storage bodies include stackings (e.g., ABAB or AAA stackings) of a quadratic chiral lattice, inverse honeycomb, double arrow, re-entrant hexagonal, re-entrant square, and other structures that can be identified by suitable computational and/or experimental methods. Example computational methods can be found in Korner and Liebold-Ribeiro, "A systematic approach to identify cellular auxetic materials," *Smart Materials and Structures* 24(2) (2015).

The NPR characteristic of the gas storage body 100 enhances the stability and capabilities of the gas storage body 100. For example, in some implementations the hydrogen encapsulated in the porous structure 102 is pressurized at a positive pressure with respect to an ambient pressure external to the gas storage body 100. Internally, this pressure can equalize between adjacent cells. For the gas storage body 100 as a whole, the pressure exerts an outward force. However, because the NPR gas storage body 100 compresses along its axes in response to compressive forces along corresponding orthogonal axes, the gas storage body 100 is stable in the presence of this pressure. For example, in some implementations the gas storage body 100 can be more stable than an analogous PPR, allowing for higher internal gas pressures to be maintained. In some implementations, the room-temperature gas pressure in at least some cells of the gas storage body 100 is at least 10 psig, at least 100 psig, at least 500 psig, at least 1000 psig, or at least 5000 psig. For efficient storage of a target gas such as hydrogen, the stored gas can be pure, e.g., having at least 95% purity or at least 99% purity (e.g., ≥99% purity $H_2$).

In addition, NPR materials that form the gas storage body 100 can be lightweight, e.g., compared to other materials/systems capable of storing comparable amounts of gas. For example, non-NPR hydrogen storage systems can include PPR tanks, such as PPR steel tanks, that are comparably heavy and accordingly consume weight budget when included in systems such as hydrogen fuel cell-powered vehicles. Using NPR gas storage bodies for storage of hydrogen can require less weight, improving overall system performance by, for example, improving fuel efficiency.

Figure 3A:
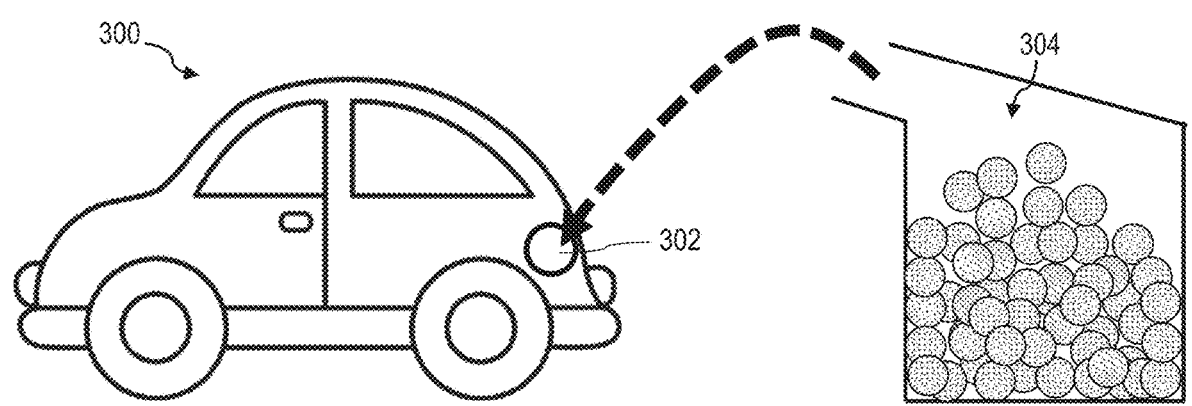
FIG. 3A is a diagram illustrating a hydrogen refill processing using NPR gas storage bodies.

NPR gas storage bodies (e.g., gas storage body 100) can be used to provide hydrogen to hydrogen fuel cells and hydrogen combustion engines. As shown in FIG. 3A, a hydrogen fuel cell vehicle 300 includes a fueling port 302. To refuel the vehicle 300, gas storage bodies 304 loaded with hydrogen are provided into the fueling port. For example, one to several dozen, or more, macroscale gas storage bodies 304, or hundreds, thousands, or millions of microscale gas storage bodies 304 storing pressurized hydrogen can be loaded into the fueling port 302 to provide a load of encapsulated hydrogen into the vehicle 300. This process can be performed at atmospheric pressure and at room temperature.

By contrast, typical hydrogen fuel cell vehicle fueling is performed using highly pressurized hydrogen from fixed, heavy tanks. The stored hydrogen is further pressurized using a compressor and subsequently cooled to −40° C. before reaching a fueling nozzle. Inside the vehicle, another pressurized hydrogen tank stores the hydrogen at about $10^4$ psig. These pressure and temperature requirements impose significant cost and safety burdens on hydrogen fuel cell operation and refilling.

Figure 3B:
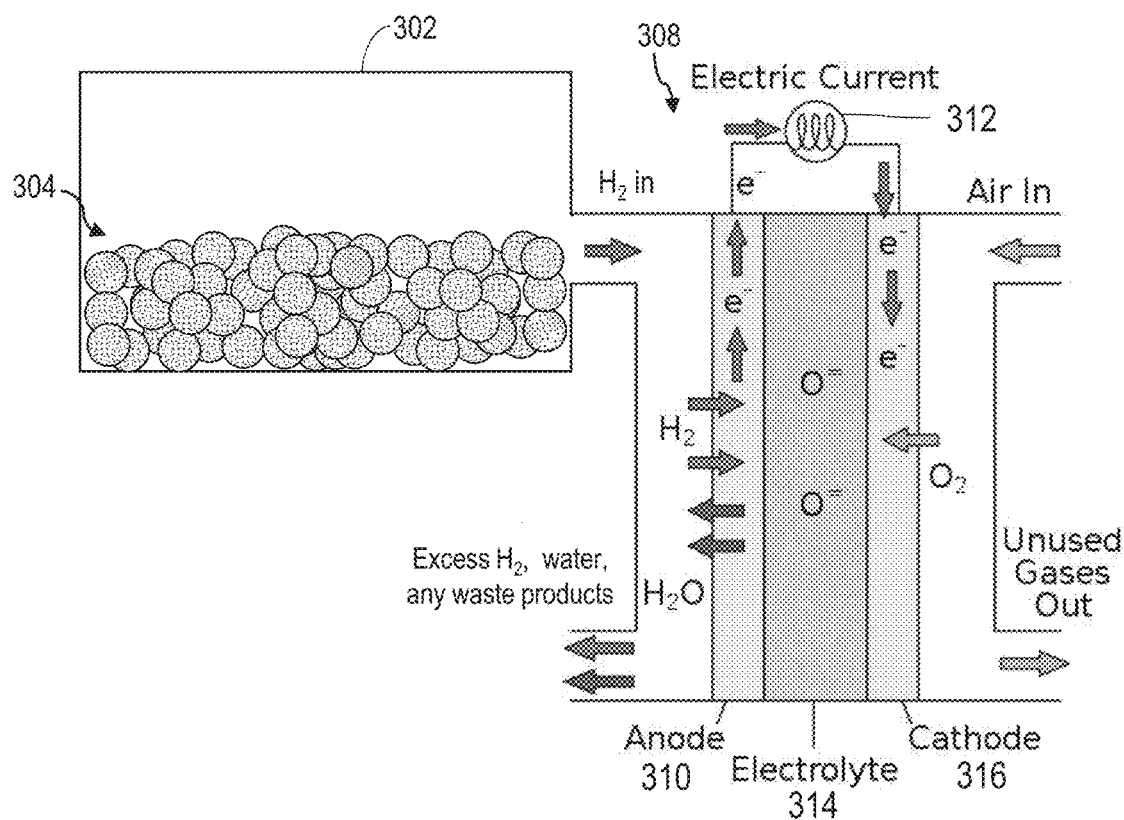
FIG. 3B is a diagram illustrating hydrogen fuel cell operation using hydrogen from NPR gas storage bodies.

As shown in FIG. 3B, the gas-loaded gas storage bodies 304 are stored in an internal storage tank 306 of the vehicle 300. Heat is provided (e.g., from a controlled heating element such as a heating coil) to melt, vaporize, and/or otherwise weaken porous structures of the gas storage bodies 304, causing the release of the hydrogen stored inside. In some implementations, air is introduced into the internal storage tank 306 so that the porous structures of the gas storage bodies combust. The released hydrogen flows into the anode 310 of a fuel cell 308, where a catalyst (e.g., a platinum catalyst) strips electrons from the hydrogen to leave protons. The stripped electrons provide current through a load 312 to, for example, power a motor of the vehicle 300. The protons travel through an electrolyte 314 to a cathode 316, where the same or a different catalyst from that in the anode 310 causes reduction of oxygen to produce water. The electrolyte 314 can be a polymer electrolyte membrane that conducts positively-charged ions (protons) and blocks electrons from the cathode 316. The oxygen can be provided from a dedicated source or, more often, from atmospheric air flowing into the fuel cell 308. The overall reaction of the fuel cell 308 is $H_2 + \frac{1}{2}O_2 \rightarrow H_2O$.

Fuel cells such as fuel cell 308, running on hydrogen provided by NPR gas storage bodies, can be deployed in vehicles such as cars, buses, and ships; in fixed systems such as home or industrial power generators; and in other deployed systems.

In implementations in which porous structures of gas storage bodies are vaporized/combusted, the gaseous products can flow out of the fuel cell 308 as a waste product along with excess $H_2$ and water vapor. In some implementations, the porous structures are weakened sufficiently to release hydrogen but are not vaporized/combusted; in such implementations, the internal storage tank 306 can be periodically cleaned or replaced to avoid harmful buildup of spent gas storage bodies.

The exploitation of hydrogen in NPR gas storage bodies is not limited to hydrogen fuel cells. In some implementations, the hydrogen can be used in a hydrogen internal combustion engine (HICE). HICEs rely on the combustion of hydrogen with oxygen (e.g., from air) to produce water vapor. In contrast to fossil fuel-based internal combustion engines, HICEs do not inherently produce carbon-based waste. Although, in some implementations, waste products are created by vaporization/combustion of porous structures of gas storage bodies, these waste products can represent less atmospheric carbon and/or other waste product than is produced by some fossil fuel-based processes, such as typical gasoline internal combustion engines.

Figure 4:
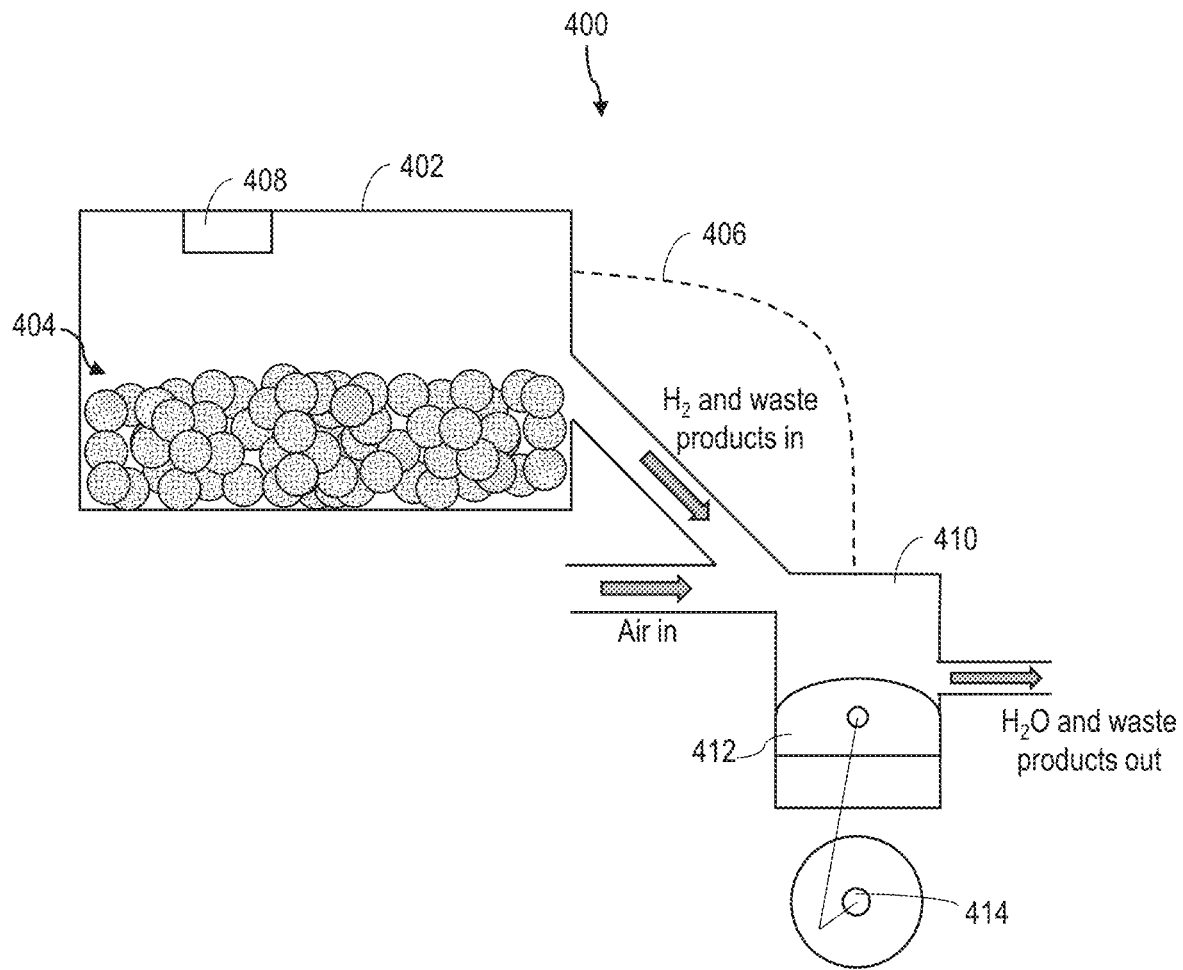
FIG. 4 is a diagram illustrating hydrogen internal combustion engine operation using hydrogen from NPR gas storage bodies.

As shown in FIG. 4, in a hydrogen internal combustion engine 400, gas storage bodies 404 are stored in an internal storage tank 402 (e.g., after loading as described in reference to FIG. 3A). The gas storage bodies 404 are heated to a temperature sufficient to vaporize the porous structures of the gas storage bodies 404, or otherwise cause conversion of the porous structures to gas. In some implementations, a heating element 408 in the internal storage tank 402 is used to provide the heat. In some implementations, the internal storage tank 402 is thermally coupled to a combustion chamber 410 (described in more detail below), so that heat released in the exothermic combustion reaction heats the internal storage tank 402 and the gas storage bodies 404 therein. For example, the internal storage tank 402 can be adjacent to and in contact with the combustion chamber 410.

Heating of the gas storage bodies 404 causes release of the hydrogen stored within. The hydrogen and gaseous waste products from vaporization of the gas storage bodies 404 flow into the combustion chamber 410. Oxygen-including air also flows into the combustion chamber 410, e.g., from an atmosphere inlet of the hydrogen internal combustion engine 400. In the combustion chamber 410, the hydrogen and the oxygen react in the reaction $2H_2+O_2\rightarrow 2H_2O$, producing liquid water/water vapor and driving movement of a piston 412. The piston 412 in turn drives movement of a crankshaft 414, e.g., to propel a vehicle. The $H_2O$ and waste products from vaporization/combustion of the gas storage bodies 404 are directed out of the hydrogen internal combustion engine 400.

In some implementations, air is directed into the internal storage tank 402 instead of, or in addition to, the combustion chamber 410. This can allow for reactions between oxygen and the gas storage bodies 404, e.g., carbon-oxygen reactions to produce gaseous $CO_2$ as a waste product, aiding in dissolution of the gas storage bodies 404 and release of the hydrogen contained therein.

In some implementations, because the gas storage bodies 404 themselves are vaporized, combusted, or otherwise converted into a gaseous form, the gas storage bodies 404 are removed from the hydrogen internal combustion engine 400 as waste product. Accordingly, the gas storage bodies 404 with hydrogen inside represent a convenient fuel source that leaves little or no residue or waste in the hydrogen internal combustion engine 400.

In addition, in some implementations, combustion of the gas storage bodies 404 and corresponding generation of combustion products helps to drive movement of the piston 412 (or analogous engine operation in another engine mechanism), such that the gas storage bodies 404 themselves act as fuel. The combined hydrogen-combustion plus gas storage body-combustion can provide greater engine power than engine operation based on only a single combusting source. The "waste products" of combustion of the gas storage bodies 404, accordingly, can contribute meaningfully to operation of the engine.

The porous structure of gas storage bodies, such as the porous structure 102 of the gas storage body 100, can be formed of one or more of various materials, depending on the implementation. In some implementations, the porous structure 102 is formed at least partly of one or more metals, ceramics, and/or polymers. For example, in some implementations the porous structure 102 is formed fully or primarily (e.g., as at least a majority of the mass of the porous structure 102) of carbon. Examples of carbon-based materials that can exhibit negative Poisson's ratio for stresses in at least some directions include porous graphite, bulk carbon nanotubes, activated carbon, collections of carbon fibers (e.g., porous carbon fibers and/or other carbon fibers), and certain carbon lattice structures (e.g., three-dimensional carbon honeycomb structures and/or fullerenes). In some implementations, a carbon-based structure is combined with one or more polymers (e.g., resin), e.g., as a carbon-fiber-reinforced polymer (CFRP) structure.

For implementations in which the porous structure 102 is to undergo vaporization/combustion (e.g., hydrogen internal combustion engine implementations such as shown in FIG. 4, or hydrogen fuel cells that incorporate vaporization/combustion in an internal storage tank), having the porous structure 102 formed substantially or entirely of carbon can provide benefits, because the by-products of this vaporization/combustion (e.g, $CO_2$) are non-toxic.

In some implementations, the porous structure 102 is formed at least partly of another material that undergoes combustion. For example, the porous structure 102 can be formed of magnesium, aluminum, titanium, or zirconium, each of which can undergo combustion under suitable pressure, temperature, and/or gaseous conditions. Other suitable materials that undergo combustion can be used instead or additionally.

In some implementations, the porous structure of a gas storage body includes a polymer and/or a metal. Examples of polymeric foams for integration into leaflets include thermoplastic polymer foams (e.g., polyester polyurethane or polyether polyurethane); viscoelastic elastomer foams; or thermosetting polymer foams such as silicone rubber. Examples of metallic foams include metallic foams based on steel (e.g., stainless steel), copper, aluminum, magnesium, zirconium, titanium (e.g., $Ti_6Al_4V$, TiNbZr, or unalloyed titanium), or other metals, or alloys thereof, or ceramics composed of a metal oxide (e.g., aluminum oxide, titanium oxide, or zirconium oxide).

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase. NPR-PPR composite materials can form the porous structures and foam structures described in any of the implementations described herein.

NPR gas storage bodies including closed cells to encapsulate gases, such as the porous structure 102 of FIG. 1, can be produced in a variety of ways. In some implementations, an initially PPR material (sometimes referred to as a "precursor material") is converted into the NPR material. For example, a porous PPR sponge or foam can be transformed to change its structure into a structure that exhibits a negative Poisson's ratio. In some examples, NPR foams are produced by transformation of nanostructured or microstructured PPR materials, such as nanospheres, microspheres, nanotubes, microtubes, or other nano- or microstructured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example of a process, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxial compression in other directions.

When fabrication processes to make closed-cell NPR structures are performed in an atmosphere, the gases of the atmosphere become trapped in the closed cells. When the fabrication processes are performed at a high pressure, the gases become trapped at the high pressure. In this manner, fabrication processes to make NPR gas storage bodies can simultaneously cause storage of gases inside the NPR gas storage bodies.

Figure 5D:
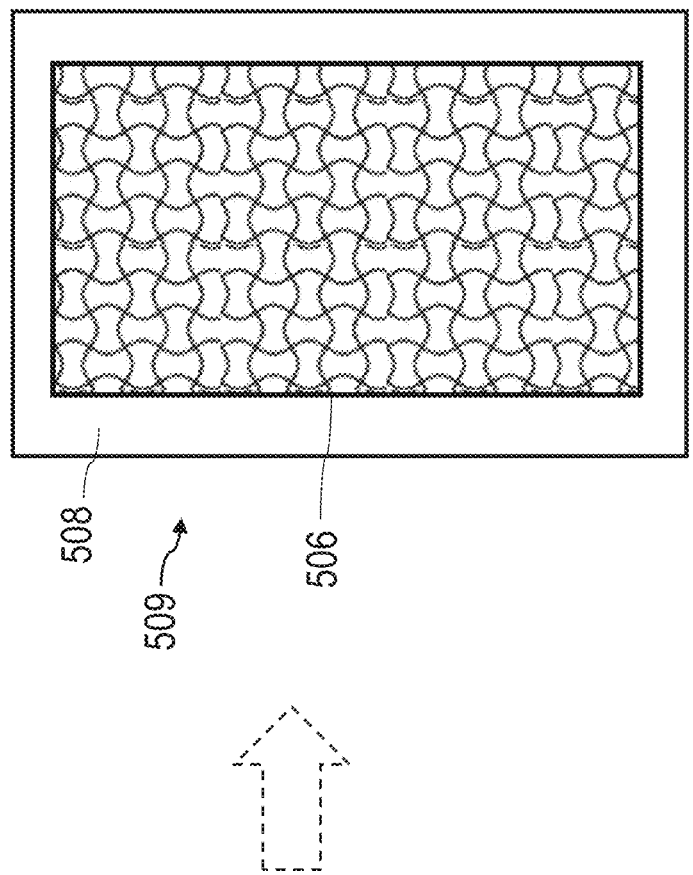
Figure 5C:
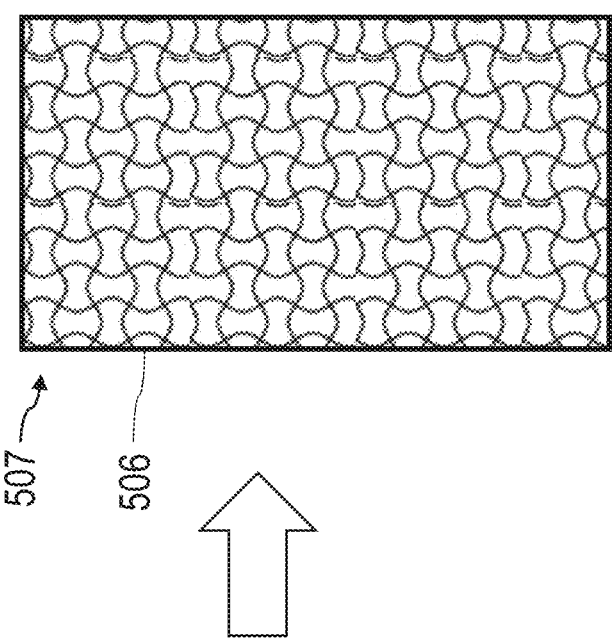

FIGS. 5A-5C illustrate an example method of making a gas storage body, such as the gas storage body 100. A granular or powdered material 500 (a precursor material), such as a polymer material (e.g., a rubber), a metal (e.g., stainless steel, titanium, magnesium, aluminum, or an alloy thereof), or carbon, or a combination thereof, is mixed with a foaming agent to form a porous material (e.g., a sponge or a foam) 502. The porous material 502 is placed into a mold 504. Pressure is applied to compress the porous material 502, and the compressed porous material 502 is heated to a temperature above its softening point. The pressure and heating are performed in the presence of a gas 505. The compressed, heated porous material 502 is then allowed to cool, resulting in an NPR material 506 (having a closed-cell porous structure) produced from the initially-PPR porous material 502. As the compressed, heated porous material 502 cools, the gas 505 remains stored in the NPR material 506 in a gas storage body 507. In some implementations, the gas storage body 507 can be divided into smaller bodies (e.g., microscale bodies), such as by cutting the gas storage body 507.

In some implementations, an NPR porous structure or composite NPR/PPR porous structure configured to store gas is coated in a PPR material. The PPR material can act as a barrier to protect underlying NPR or composite NPR/PPR materials from corrosion, degradation, oxidation, and/or other effects of exposure. In some implementations, the PPR material can improve mechanical properties (e.g., stress response properties) of the gas storage bodies as a whole, which can provide improved stability (e.g., improved resilience to shocks occurring during handling/transfer of the gas storage bodies) and/or allow for higher internal gas pressures, increasing the amount of gas that can be stored in a given volume of gas storage body. For example, because the PPR material can respond to stresses in an opposite manner than NPR materials (e.g., contracting instead of expanding), resulting forces in gas storage bodies having the PPR material as a coating can cancel one another out, improving overall mechanical stability.

As shown in FIG. 5C, to form a gas storage body 509 with a PPR coating, the NPR material 506 is covered with an outer PPR material 508, which is adhered to the NPR material 506. The NPR material 506 in this arrangement can be referred to as an internal NPR portion, and the PPR coating can be referred to as an outer PPR portion. The PPR material 508 can be provided by dip-coating, by evaporative coating, by spray-coating, or by another suitable method. In some implementations, heat and pressure are applied again to cure and/or bond together the NPR material 506 and the PPR material 508 to form a cohesive structure. In some implementations, a thickness of the PPR material 508 is between 1% and 25% of a total thickness of the gas storage body 509.

Figure 6B:
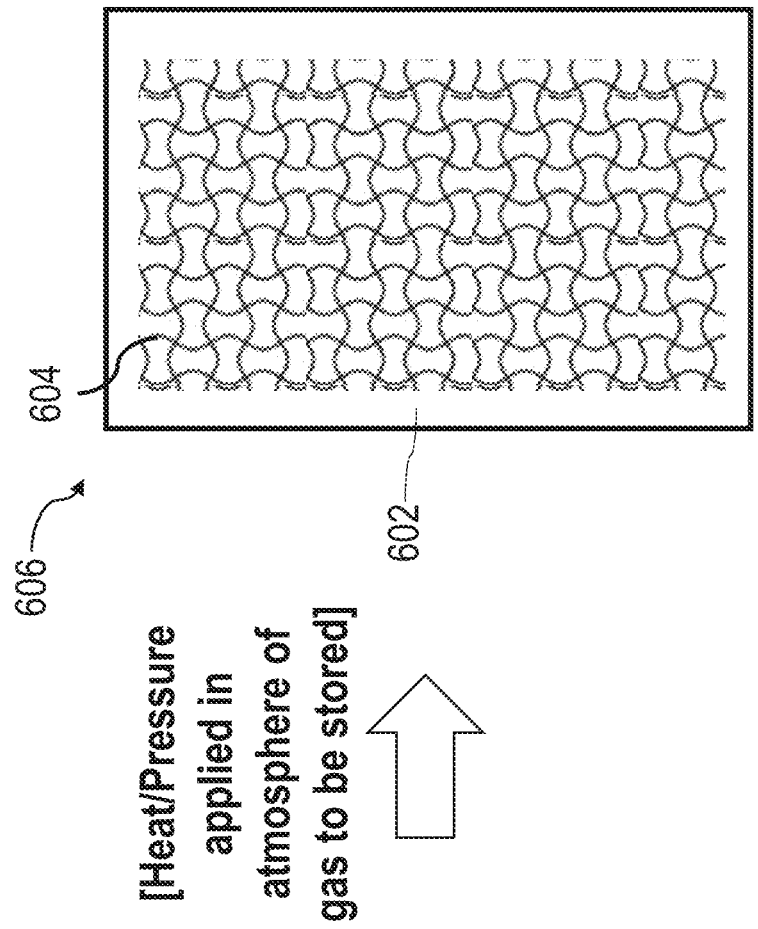
FIGS. 6A-6B are diagrams illustrating an example of a method of making gas-encapsulating NPR gas storage bodies with a PPR coating.
Figure 6A:
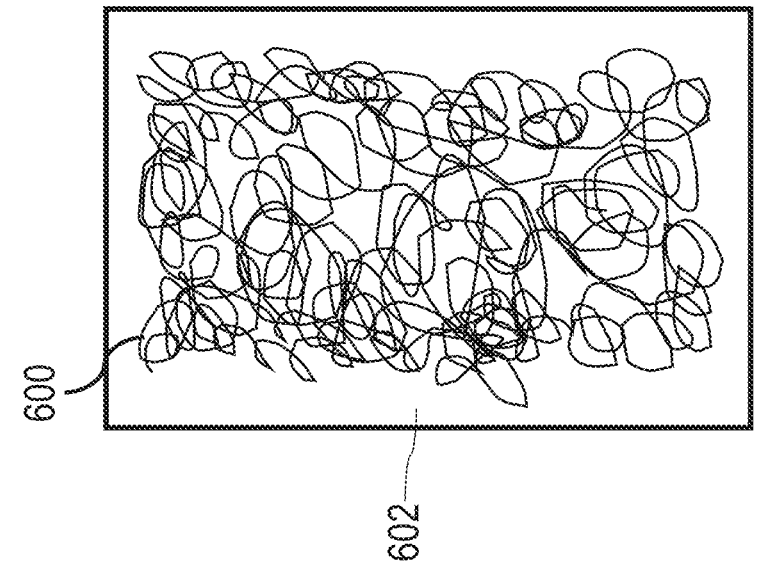

FIGS. 6A-6B show an example of another method of fabricating a gas storage body with an internal NPR portion. As shown in FIG. 6A, a precursor material 600 is enclosed in a PPR material 602. In some implementations, the precursor material 600 and the PPR material 602 are adhered and/or bonded together. Heat and/or pressure are applied to convert the precursor material 600 into an NPR portion 604 enclosed in the PPR material 602, the NPR portion 604 and the PPR material 602 together forming a gas storage body 606. The heat and/or pressure are applied in an atmosphere of the gas to be stored into the resulting gas storage body, such that the gas becomes trapped in closed cells of the NPR portion 604. In some implementations, the heat and/or pressure that convert the precursor material 600 into the NPR portion 604 concurrently cure and/or bond together the NPR portion 604 and the PPR material 602, reducing fabrication complexity and cost. In some implementations, the PPR material 602 is itself modified by the heat and/or pressure, e.g., to convert a first form of carbon into a second form of carbon (e.g., into pyrolytic carbon).

In some implementations, a material to be stored in an NPR structure can be stored, at least initially, in a liquid or solid form. For example, during the NPR-forming process illustrated in FIGS. 5B and 6B, pressure and temperature conditions can be such that the material to be stored (e.g., hydrogen) is in a liquid or solid state during formation of closed cells of the NPR material. The gas storage bodies (in these implementations, liquid or solid storage bodies) can be maintained at low temperatures during subsequent transportation/storage of the storage bodies. Accordingly, descriptions in this disclosure of gas storage can also apply to liquid storage or solid storage inside closed cells of NPR storage bodies. In some implementations, storage bodies are allowed to increase in temperature (from a lower temperature at which the NPR material was caused to be NPR) until the material stored therein is gaseous (from an initially solid or liquid state), subject to the pressure storage limits of the NPR structure.

Various modifications will be apparent from the foregoing detailed description. For example, although several implementations in which hydrogen gas is stored have been provided, other gases, liquids, or solids can be stored instead or additionally. For example, various implementation according to this disclosure can be used to store oxygen, hydrocarbons, synthesis compounds, compounds such as nitrogen trifluoride and sulfur hexafluoride, or any other suitable materials that is chemically compatible with material(s) that form the porous NPR structure of gas storage bodies, and these materials can be stored in liquid, gas, or slid states. The stored materials can be a mix of multiple different individual materials. Further, features described above in connection with different implementations may, in some cases, be combined in the same implementation. In some instances, the order of the process steps may differ from that described in the particular examples above.

Accordingly, other implementations are also within the scope of the claims.

What is claimed is:

1. A gas storage apparatus comprising:
   a foam body having a negative Poisson's ratio; and
   a gas impregnated in closed cells of the foam body, the gas having a pressure above atmospheric pressure.

2. The gas storage apparatus of claim 1, wherein the gas comprises hydrogen.

3. The gas storage apparatus of claim 2, wherein the hydrogen has a purity of at least 95%.

4. The gas storage apparatus of claim 1, wherein the foam body comprises a porous carbon structure.

5. The gas storage apparatus of claim 1, wherein the foam body comprises a stacked re-entrant cell structure.

6. The gas storage apparatus of claim 1, wherein the foam body is a microsphere or a nanosphere.

7. The gas storage apparatus of claim 1, wherein the foam body has a dimension of less than 100 microns.

8. The gas storage apparatus of claim 1, wherein the gas impregnated in the closed cells of the foam body has a pressure of at least 100 psig.

9. The gas storage apparatus of claim 1, comprising a coating covering the foam body, the coating having a positive Poisson's ratio.

10. The gas storage apparatus of claim 1, wherein the foam body comprises a combustible metal.

11. A method of making a gas storage apparatus, the method comprising:
providing a first body comprising a precursor material; and
while the first body is in an atmosphere comprising a gas, applying a stimulus to the precursor material, the stimulus causing the precursor material to form a closed-cell porous foam structure having a negative Poisson's ratio,
wherein cells of the closed-cell porous foam structure encapsulate the gas at a pressure above atmospheric pressure.

12. The method of claim 11, wherein the stimulus comprises at least one of heat or pressure.

13. The method of claim 11, wherein the gas comprises hydrogen.

14. The method of claim 13, wherein the hydrogen has a purity of at least 95%.

15. The method of claim 11, comprising:
subsequent to applying the stimulus, dividing the first body comprising the closed-cell porous foam into a plurality of gas storage bodies, each gas storage body having a dimension less than 100 microns.

16. The method of claim 11, comprising forming a coating having a positive Poisson's ratio over the first body.

17. A method comprising:
providing a gas storage body into an internal storage tank of a vehicle, wherein the gas storage body comprises a foam body having a negative Poisson's ratio, and hydrogen gas impregnated in closed cells of the foam body;
releasing the hydrogen gas from the foam body; and
reacting the released hydrogen gas with oxygen gas.

18. The method of claim 17, wherein releasing the hydrogen gas from the foam body comprises vaporizing or combusting the foam body.

19. The method of claim 17, wherein reacting the released hydrogen gas with oxygen gas comprises combusting the released hydrogen gas and the oxygen gas.

20. The method of claim 17, wherein reacting the released hydrogen gas with oxygen gas comprises facilitating a redox reaction in a hydrogen fuel cell.

* * * * *